United States Patent
Xu et al.

(10) Patent No.: US 11,460,612 B2
(45) Date of Patent: Oct. 4, 2022

(54) SPACER

(71) Applicant: GENIUS ELECTRONIC OPTICAL (XIAMEN) CO., LTD., Fujian (CN)

(72) Inventors: Ziwen Xu, Fujian (CN); Junjiao Chen, Fujian (CN); Haibin Zhan, Fujian (CN)

(73) Assignee: GENIUS ELECTRONIC OPTICAL (YIAMEN) CO., LTD., Fujian (CN)

( * ) Notice: Subject to any disclaimer, the term of this patent is extended or adjusted under 35 U.S.C. 154(b) by 278 days.

(21) Appl. No.: 16/944,155

(22) Filed: Jul. 31, 2020

(65) Prior Publication Data

US 2021/0389510 A1 Dec. 16, 2021

(30) Foreign Application Priority Data

Jun. 11, 2020 (CN) .......................... 202010527387.1

(51) Int. Cl.
*G02B 5/00* (2006.01)
*G02B 1/11* (2015.01)
*G02B 7/02* (2021.01)

(52) U.S. Cl.
CPC ................ *G02B 5/003* (2013.01); *G02B 1/11* (2013.01); *G02B 7/021* (2013.01)

(58) Field of Classification Search
CPC ........ G02B 7/021; G02B 7/025; G02B 7/026; G02B 5/003; G02B 5/18; G02B 5/22; G02B 5/28; G02B 5/226; G02B 1/04; G02B 1/041; G02B 1/11; G02B 1/14
See application file for complete search history.

(56) References Cited

U.S. PATENT DOCUMENTS

| | | | |
|---|---|---|---|
| 2015/0022896 A1* | 1/2015 | Cho | G02B 7/026 359/601 |
| 2020/0201147 A1* | 6/2020 | Wei | G03B 17/12 |
| 2020/0310226 A1* | 10/2020 | Feng | G02B 27/0018 |

\* cited by examiner

*Primary Examiner* — Sultan Chowdhury
(74) *Attorney, Agent, or Firm* — JCIPRNET

(57) ABSTRACT

A spacer, including a spacer body, a light transmissive film, and a light absorbing film, is provided. The spacer body has an outer side surface, an inner inclined surface, an object side surface, and an image side surface. The object side surface faces an object side and connects the outer side surface with the inner inclined surface. The image side surface faces an image side and connects the outer side surface with the inner inclined surface. The inner inclined surface is located between an optical axis of the spacer and the outer side surface, and includes an inner edge adjacent to the optical axis and an outer edge away from the optical axis. The inner edge forms a light through hole. The light transmissive film and the light absorbing film are disposed on the inner inclined surface. All surfaces facing the optical axis are inclined relative to the optical axis.

20 Claims, 13 Drawing Sheets

| Spacer body | Material | Tmax | Lbmax | Do | Dio | Dii | \|Dio-Dii\| | Do/\|Dio-Dii\| | Do/Tmax | Do/Lbmax |
|---|---|---|---|---|---|---|---|---|---|---|
| FIG. 3 embodiment | Metal | 0.100 | 0.140 | 5.500 | 4.400 | 4.700 | 0.300 | 18.333 | 55.000 | 39.286 |
| FIG. 7 embodiment | Metal | 0.150 | 0.212 | 8.200 | 7.146 | 7.400 | 0.254 | 32.283 | 54.667 | 38.679 |
| FIG. 8 embodiment | Metal | 0.355 | 0.524 | 4.000 | 2.179 | 2.917 | 0.738 | 5.418 | 11.277 | 7.628 |
| FIG. 9 embodiment | Plastic | 0.529 | 0.305 | 4.240 | 3.106 | 3.801 | 0.695 | 6.100 | 8.012 | 13.915 |
| FIG. 10 embodiment | Metal | 0.287 | 0.357 | 5.300 | 4.113 | 4.456 | 0.343 | 15.461 | 18.467 | 14.858 |
| FIG. 11 embodiment | Metal | 0.393 | 0.443 | 4.100 | 3.132 | 3.560 | 0.428 | 9.586 | 10.433 | 9.261 |

FIG. 14

1
SPACER

CROSS-REFERENCE TO RELATED APPLICATION

This application claims the priority benefit of China application serial no. 202010527387.1, filed on Jun. 11, 2020. The entirety of the above-mentioned patent application is hereby incorporated by reference herein and made a part of this specification.

BACKGROUND OF THE INVENTION

1. Field of the Invention

The disclosure relates to an optical element, and more particularly to a spacer.

2. Description of Related Art

When designing an assembly structure for an existing optical imaging lens, if an optical boundary distance between adjacent lens elements is too long, due to the limitation of lens injection molding, a spacer needs to be disposed between lens elements by a lens assembly portion for installation. A material of common spacers is black plastic, which may be used to absorb light and reduce stray light in a lens barrel. However, in the design of a stress structure of an optical imaging lens, the structural strength of the plastic spacer is weak, and when the spacer is thinner, it is easy to cause deformation and cause eccentricity, which has the problem of insufficient structural strength. However, a metal spacer will result in the problem that a metal surface is easy to reflect and various stray light is caused. The current solution is to apply special ink to the metal spacer to cover the metal surface, but when special ink is applied to a light through hole of the metal spacer, the special ink sometimes fails to completely cover the light through hole of the metal spacer after being dried, so that sharp corners of the metal spacer are exposed to cause shower flare. Therefore, how to design a spacer with sufficient structural strength and capable of reducing stray light is a long-standing problem in the industry.

In addition, in the process of manufacturing plastic spacers by an injection molding process in the prior art, light through holes of the spacers cannot achieve a sharp-corner structure of an original design mold but generate a rounded-corner structure due to the limitation of plastic materials. Shower flare will also be generated when light from different angles is emitted to the rounded-corner structure of the light through hole, which is also a problem to be solved.

SUMMARY OF THE INVENTION

The disclosure provides a spacer, which can facilitate the stress transmission of a lens barrel and a lens to increase the structural strength for lens installation and effectively improve the problem of stray light.

An embodiment of the disclosure provides a spacer, which includes a spacer body, a light transmissive film, and a light absorbing film. The spacer body has an outer side surface, an inner inclined surface, an object side surface, and an image side surface. The object side surface faces an object side, and connects the outer side surface with the inner inclined surface. The image side surface faces an image side, and connects the outer side surface with the inner inclined surface. The inner inclined surface is located between an optical axis of the spacer and the outer side surface. The inner inclined surface includes an inner edge adjacent to the optical axis and an outer edge far away from the optical axis. The inner edge forms a light through hole. A material of the spacer body is metal. The light transmissive film and the light absorbing film are disposed on the inner inclined surface. All surfaces of the spacer body facing the optical axis are inclined relative to the optical axis. The spacer conforms to Do/Tmax≤55.000, where Do is a maximum outer diameter of the spacer in a direction perpendicular to the optical axis, and Tmax is a maximum thickness of the spacer in a direction of the optical axis.

An embodiment of the disclosure provides a spacer, which includes a spacer body, a light transmissive film, and a light absorbing film. The spacer body has an outer side surface, an inner inclined surface, an object side surface, and an image side surface. The object side surface faces an object side, and connects the outer side surface with the inner inclined surface. The image side surface faces an image side, and connects the outer side surface with the inner inclined surface. The inner inclined surface is located between an optical axis of the spacer and the outer side surface. The inner inclined surface includes an inner edge adjacent to the optical axis and an outer edge far away from the optical axis. The inner edge forms a light through hole. The inner inclined surface has a micro structure. A surface roughness of the inner inclined surface is greater than a surface roughness of the object side surface and a surface roughness of the image side surface. A material of the spacer body is metal. The light transmissive film and the light absorbing film are disposed on the inner inclined surface. The spacer conforms to Do/Tmax≤55.000, where Do is a maximum outer diameter of the spacer in a direction perpendicular to the optical axis, and Tmax is a maximum thickness of the spacer in a direction of the optical axis.

An embodiment of the disclosure provides a spacer, which includes a spacer body, a light transmissive film, and a light absorbing film. The spacer body has an outer side surface, an inner inclined surface, an object side surface, and an image side surface. The object side surface faces an object side, and connects the outer side surface with the inner inclined surface. The image side surface faces an image side, and connects the outer side surface with the inner inclined surface. The inner inclined surface is located between an optical axis of the spacer and the outer side surface. The inner inclined surface includes an inner edge adjacent to the optical axis and an outer edge far away from the optical axis. The inner edge forms a light through hole. The inner inclined surface has a micro structure. A surface roughness of the inner inclined surface is greater than a surface roughness of the object side surface and a surface roughness of the image side surface. The surface roughness of the inner inclined surface is greater than or equal to 0.200 μm and less than or equal to 7.000 μm. The light transmissive film and the light absorbing film are disposed on the inner inclined surface. The spacer conforms to Do/Tmax≤55.000, where Do is a maximum outer diameter of the spacer in a direction perpendicular to the optical axis, and Tmax is a maximum thickness of the spacer in a direction of the optical axis.

In the spacer of the embodiment of the disclosure, since the inner inclined surface and the light transmissive film and the light absorbing film disposed thereon are used to effectively reduce the reflectivity of the inner inclined surface, the problem of stray light generated by the spacer can be effectively improved.

BRIEF DESCRIPTION OF THE DRAWINGS

FIG. 14 is a table of various parameters of the spacer bodies of the various embodiments.

DESCRIPTION OF THE EMBODIMENTS

Figure 1:
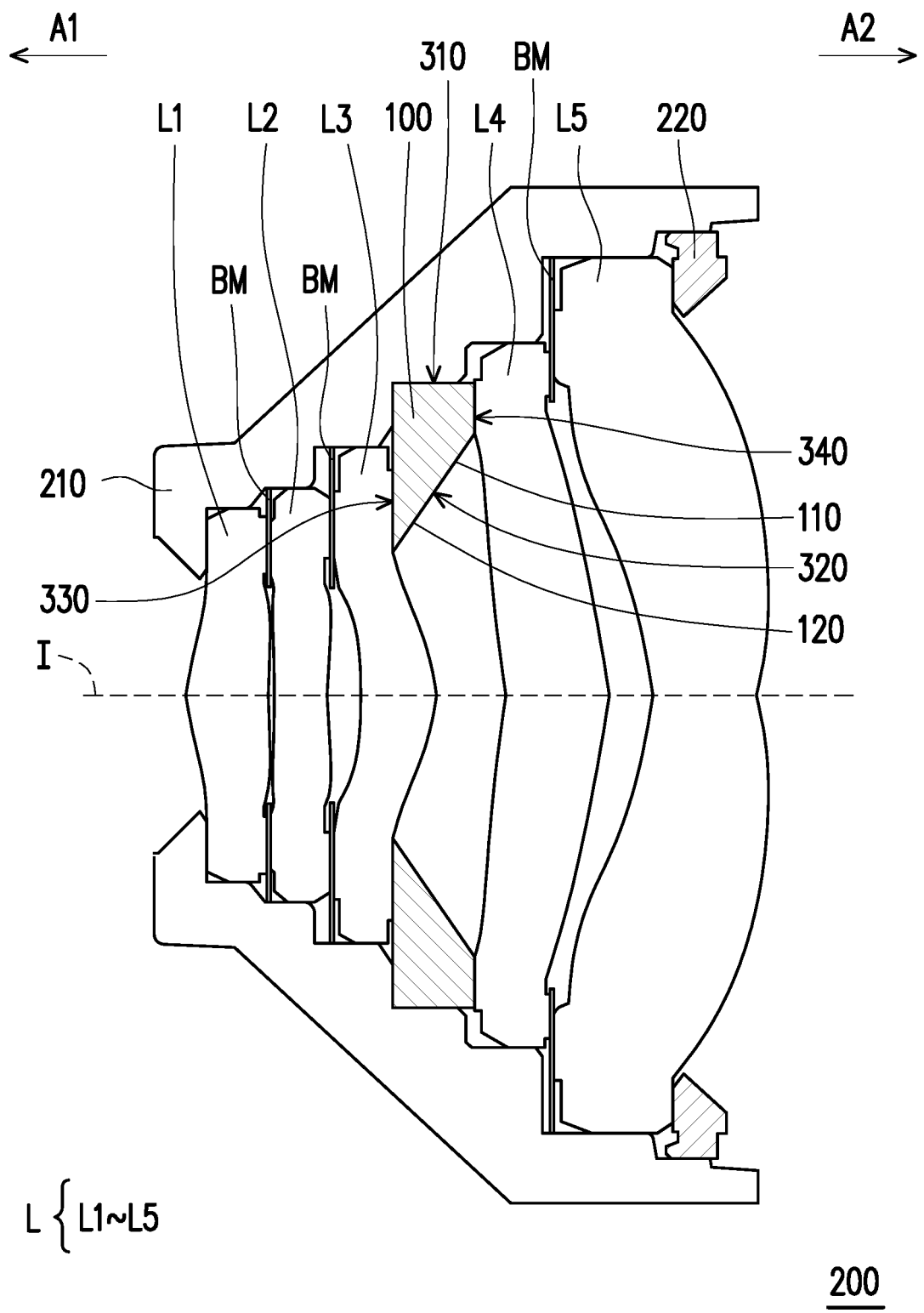
FIG. 1 is a schematic cross-sectional view of a spacer disposed in a lens barrel of a lens module according to an embodiment of the disclosure.
Figure 2:
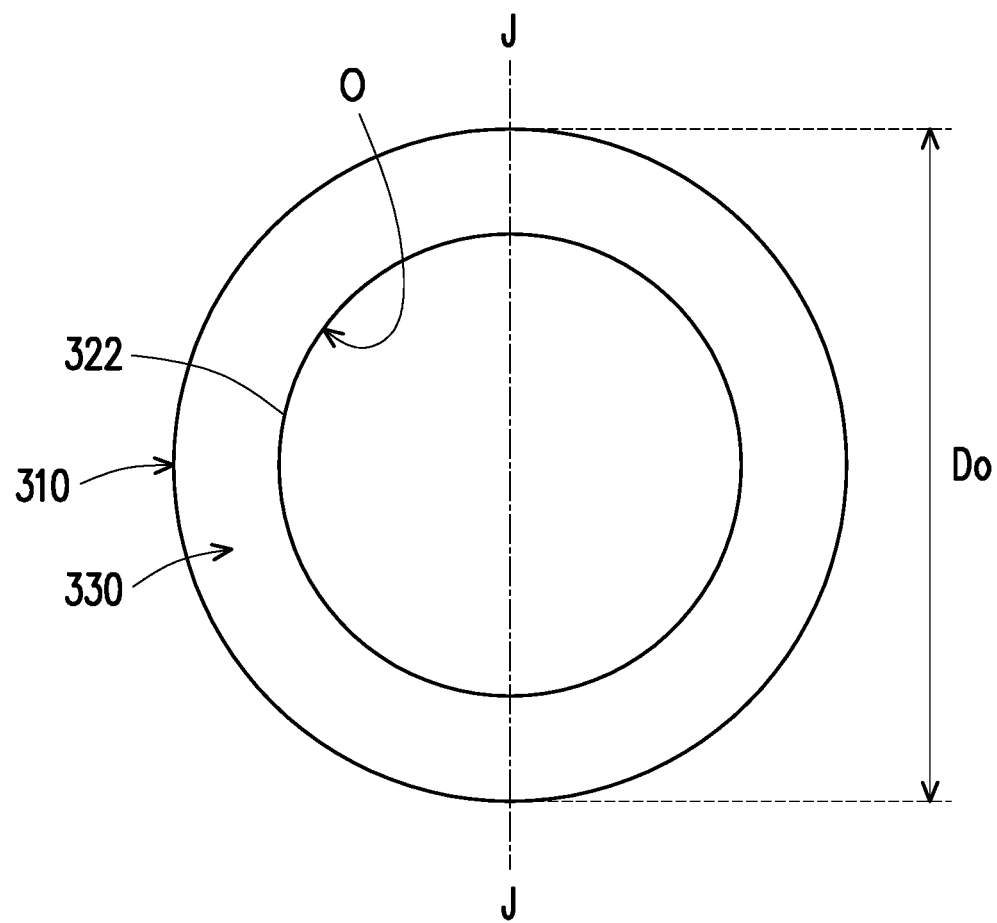
FIG. 2 is a front view of an object side of the spacer of FIG. 1.
Figure 3:
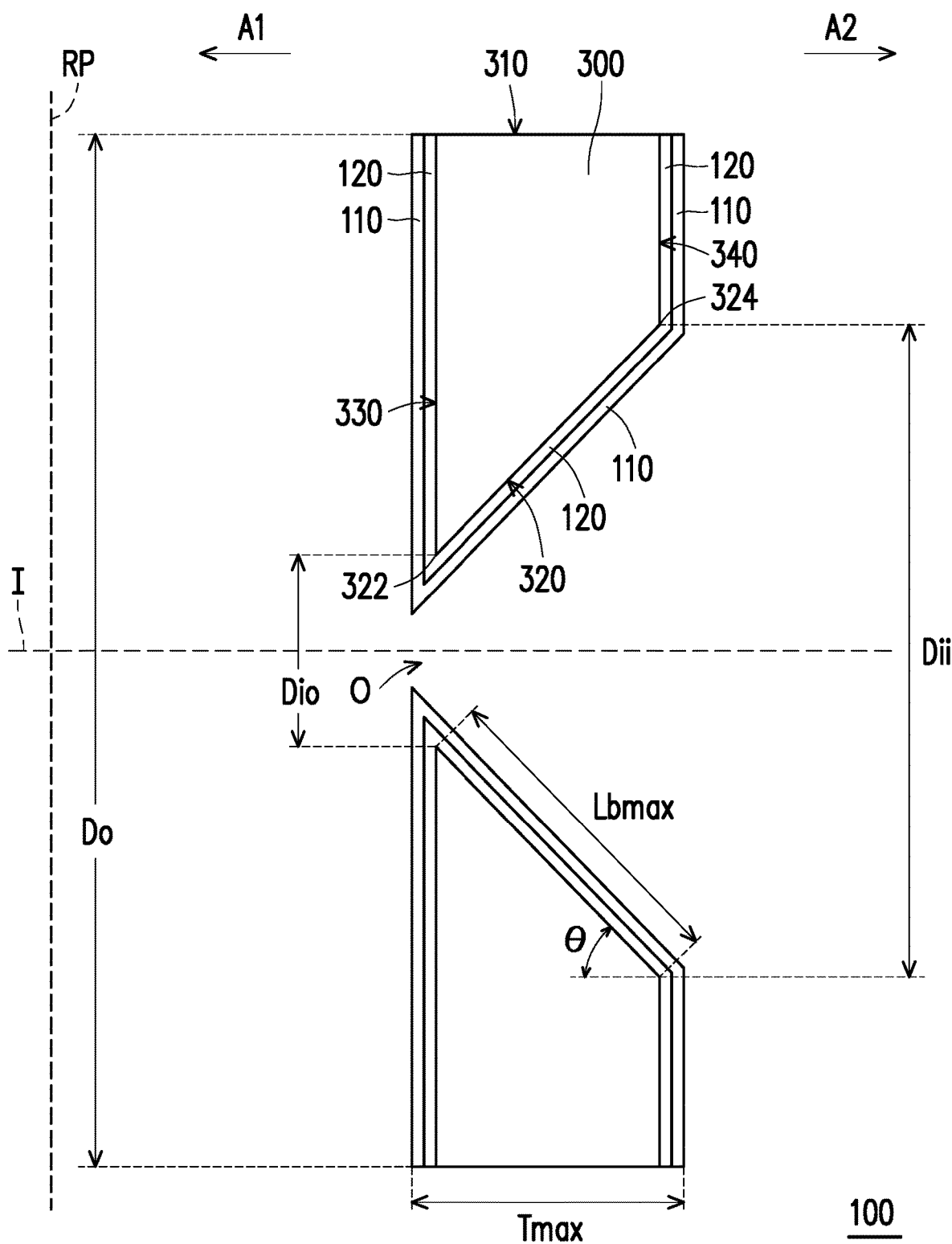
FIG. 3 is a schematic cross-sectional view of the spacer of FIG. 2 along a line J-J.
Figure 4:
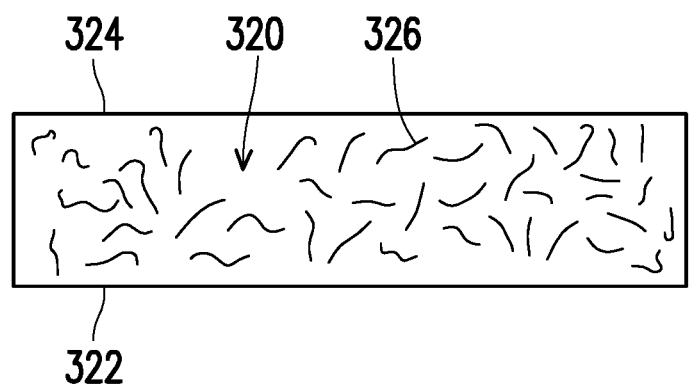
FIG. 4 is a schematic view of an inner inclined surface of the spacer of FIG. 1 when the spacer is viewed outward from an optical axis in a radial direction.

FIG. 1 is a schematic cross-sectional view of a spacer disposed in a lens barrel of a lens module according to an embodiment of the disclosure. FIG. 2 is a front view of an object side of the spacer of FIG. 1. FIG. 3 is a schematic cross-sectional view of the spacer of FIG. 2 along a line J-J. FIG. 4 is a schematic view of an inner inclined surface of the spacer of FIG. 1 when the spacer is viewed outward from an optical axis in a radial direction. Referring to FIG. 1 and FIG. 2 to FIG. 4, a spacer 100 of the present embodiment may be disposed between assembly portions (that is, edge parts for fixing outside an optical boundary) of two lens elements L (for example, a lens element L3 and a lens element L4 of FIG. 1) in a lens barrel 210 of a lens module 200. A plurality of lens elements L (for example, lens elements L1, L2, L3, L4, and L5) are sequentially arranged in the lens barrel 210 along an optical axis I from an object side A1 to an image side A2, and these lens elements L may be fixed in the lens barrel 210 by a lens retainer 220 on the image side A2. In addition to the spacer 100 being provided between the assembly portions of two of some adjacent lens elements L, a light shading sheet BM may be provided between the assembly portions of two of some adjacent lens elements L, for example, a light shading sheet BM between the assembly portions of the lens element L1 and the lens element L2, a light shading sheet BM between the assembly portions of the lens element L2 and the lens element L3, and a light shading sheet BM between the assembly portions of the lens element L4 and the lens element L5.

In the present embodiment, the spacer 100 includes a spacer body 300, a light transmissive film 110, and a light absorbing film 120. The spacer body 300 has an outer side surface 310, an inner inclined surface 320, an object side surface 330, and an image side surface 340. The object side surface 330 faces an object side A1, and connects the outer side surface 310 with the inner inclined surface 320. The image side surface 340 faces an image side A2, and connects the outer side surface 310 with the inner inclined surface 320. It is worth being specially defined that facing the object side A1 means that an angle between an orientation direction of a surface and a direction of the object side A1 is less than 90 degrees, that is to say, directly facing the object side A1 and obliquely facing the object side A1 are both considered to facing the object side A1, but three cases of facing away from the object side A1, obliquely facing away from the object side A1, and the angle of 90 degrees between the orientation direction of the surface and the direction of the object side A1 cannot be interpreted as facing the object side A1. Similarly, facing the image side A2 means that an angle between the orientation direction of the surface and a direction of the image side A2 is less than 90 degrees, that is to say, directly facing the image side A2 and obliquely facing the image side A2 are both considered to facing the image side A2, but three cases of facing away from the image side A2, obliquely facing away from the image side A2, and the angle of 90 degrees between the orientation direction of the surface and the direction of the image side A2 cannot be interpreted as facing the image side A2.

The inner inclined surface 320 is located between an optical axis I of the spacer 100 and the outer side surface 310. The inner inclined surface 320 includes an inner edge 322 adjacent to the optical axis I and an outer edge 324 far away from the optical axis I. The inner edge 322 forms a light through hole O. The inner inclined surface 320 is inclined relative to the optical axis I. In the present embodiment, the inner edge 322 is located on the object side and connected to the object side 330, and the outer edge 324 is located on the image side and connected to the image side surface 340. In addition, in the present embodiment, the inner inclined surface 320, the outer side surface 310, the object side surface 330, and the image side surface 340 are all axisymmetric relative to the optical axis I. That is to say, the inner inclined surface 320 has a conical shape, the outer side surface 310 has a cylindrical shape, and the object side surface 330 and the image side surface 340 have an annular shape.

In the present embodiment, a material of the spacer body 300 is metal. The light transmissive film 110 and the light absorbing film 120 are disposed on the inner inclined surface 320, the object side surface 330, and the image side surface 340, so that a metallic appearance of the spacer 100 may be black. In the present embodiment, the light absorbing film 120 is disposed between the light transmissive film 110 and the spacer body 300. A light absorptivity of the light absorbing film 120 is greater than a light reflectivity, and a light transmissivity of the light transmissive film 110 is greater than the light reflectivity. The light transmissive film 110 is, for example, an anti-reflection multilayer film, which may effectively reduce the reflectivity of light emitted to the inner inclined surface 320, so that most of the light passes through the light transmissive film 110 and is transmitted to the light absorbing film 120. The light absorbing film 120 can absorb most of light incident thereon, thereby reducing the reflectivity of the light emitted to the inner inclined surface 320. In an embodiment, a reflectivity of the spacer 100 within a wavelength light range of 400 to 870 nanometers (nm) is less than or equal to 1.000% by the light absorbing film 120 and the light transmissive film 110 on the spacer 100.

All surfaces of the spacer body 300 facing the optical axis I are inclined relative to the optical axis I. The surfaces facing the optical axis I refer to surfaces facing the optical axis I straightly or obliquely and at an included angle of less than 90 degrees to the optical axis I, do not include a surface facing away from the optical axis I straightly and a surface facing away from the optical axis I obliquely, and also do not include a surface perpendicular to the optical axis I. In the present embodiment, all the surfaces of the spacer body 300 facing the optical axis I only have the inner inclined surface 320, and the inner inclined surface 320 is inclined relative to the optical axis I.

In addition, the spacer 100 conforms to Do/Tmax≤55.000, where Do is a maximum outer diameter of the spacer 100 in a direction perpendicular to the optical axis I, and Tmax is a maximum thickness of the spacer in a direction of the optical axis I. When the spacer 100 meets this condition, it is beneficial to cooperate with the stress transmission of the lens barrel 210 and the lens element L to increase the structural strength for the installation of the lens element L.

In the spacer 100 of the present embodiment, since the inner inclined surface 320 and the light transmissive film 110 and the light absorbing film 120 disposed thereon are used to effectively reduce the reflectivity of the inner inclined surface 320, the problem of stray light generated by the spacer 100 can be effectively improved. In this case, the material of the spacer body 300 may adopt metal, which is beneficial to avoid lens eccentricity caused by the deformation of the spacer 100 during assembly and solve the problem that a light through hole of the metal spacer cannot be completely covered after special ink applied to the metal spacer 100 is dried to make sharp corners of the metal spacer exposed to cause shower flare, and is beneficial to design a thicker spacer 100. The material of the spacer body 300 may be metal such as stainless steel, copper, aluminum, titanium, iron, or zinc, or an alloy thereof. In addition, the material of the spacer body 300 may also be plastic. In this case, the design of the spacer 100 of the present embodiment is beneficial to avoid the problem of shower flare caused by a rounded-corner structure of a plastic spacer in the process of manufacturing the plastic spacer by injection molding, and is beneficial to make the reflectivity of the spacer 100 for light with a wavelength of 400 to 870 nm less than 1.000% to suppress various stray light and retain smooth surfaces of the object side surface 330 and the image side surface 340 to facilitate the assembly of the spacer 100 and the lens element L, thereby avoiding eccentricity or other assembly errors.

Figure 5:
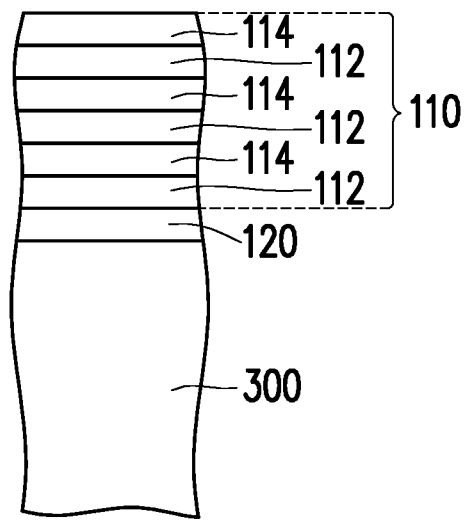
FIG. 5 is a partially enlarged schematic cross-sectional view of a light transmissive film and a light absorbing film of FIG. 3.

In the present embodiment, as shown in FIG. 5, the light transmissive film 110 includes at least one first layer 112 and at least one second layer 114. As shown in the figure, a refractive index of the at least one second layer 114 is lower than a refractive index of the at least one first layer 112, and the at least one first layer 112 and the at least one second layer 114 are alternately stacked on the light absorbing film 120. In the present embodiment, for example, a plurality of first layers 112 and a plurality of second layers 114 are alternately stacked, but the disclosure does not limit the number of first layers 112 and the number of second layers 114, which may be any suitable number. By stacking the first layers 112 and the second layers 114 alternately, the principle of thin film interference may be used to achieve destructive interference with reflected light by modulating an optical path difference, thereby reducing the reflectivity of the light transmissive film 110 and improving the transmissivity of the light transmissive film 110.

The materials of the light transmissive film 110 and the light absorbing film 120 in the present embodiment may include metal nitrides, metal fluorides, metal hydrides, metal oxides, semiconductor elements, nitrides of semiconductor elements, fluorides of semiconductor elements, hydrides of semiconductor elements, and hydroxides of semiconductor elements, or combinations thereof. For example, the materials of the light transmissive film 110 and the light absorbing film 120 are, for example, titanium oxide (TixOy), chromium oxide (CrxOy), silicon oxide (SiOx), sodium aluminum fluoride (NaxAlFy), magnesium fluoride (MgFx), aluminium oxide (AlxOy), yttrium oxide (YxOy), hafnium oxide (HfOx), zirconium oxide (ZrOx), tantalum oxide (TaOx), polycarbonate (PC) or a combination thereof, where x and y represent quantitative proportions of each element in this compound.

In the present embodiment, the spacer 100 conforms to Do/Lbmax≤40.000, where Lbmax is a length of the inner inclined surface 320 from the inner edge 322 to the outer edge 324. When the spacer 100 meets this condition, it is beneficial to cooperate with the stress transmission of the lens barrel 210 and the lens element L to increase the structural strength for the installation of the lens element L. In the present embodiment, the spacer 100 conforms to Do/|Dio−Dii|≤33.000, where Dio is an inner diameter of the object side surface 330, and Dii is an inner diameter of the image side surface 340. When the spacer 100 meets this condition, it is beneficial to cooperate with the stress transmission of the lens barrel 210 and the lens element L to increase the structural strength for the installation of the lens element L. In addition, in the present embodiment, an inclination angle θ of the inner inclined surface 320 relative to the optical axis I is greater than or equal to 5.000 degrees and less than or equal to 70.000 degrees, and when the inner inclined surface 320 meets this condition, it is beneficial to reduce the stray light in the lens barrel 210.

In the present embodiment, the inner inclined surface 320 has a micro structure 326. The micro structure 326 is irregularly distributed. For example, a plurality of micro structures 326 are irregularly shaped and arranged irregularly, which is beneficial to suppress the effects of various stray light. The micro structure 326 may be a convex structure, a concave structure, or a combination of both. In addition, in the present embodiment, a surface roughness of the inner inclined surface 320 is greater than a surface roughness of the object side surface 330, and the surface roughness of the inner inclined surface 320 is greater than a surface roughness of the image side surface 340. The surface roughness here refers to a Sa value defined by ISO 25178 series. In the present embodiment, the surface roughness of the inner inclined surface 320 is greater than or equal to 0.200 μm and less than or equal to 7.000 μm, which is beneficial to increase the number of reflections of stray light between the micro structures 326 to effectively suppress the stray light. In an embodiment, the surface roughness of the inner inclined surface 320 is greater than or equal to 0.200 μm and less than or equal to 4.000 μm, which is beneficial to weaken various stray light. In another embodiment, the surface roughness of the inner inclined surface 320 is greater than or equal to 4.000 μm and less than or equal to 7.000 μm, which is beneficial to suppress shower flare.

Because the inner inclined surface 320 has a micro structure 326 and the surface roughness of the inner inclined surface 320 is greater than the surface roughness of the object side surface 330 and the image side surface 340, when light is irradiated on the inner inclined surface 320, a scattering effect will be generated, a metallic appearance of the inner inclined surface 320 may be matte black by the cooperation of the light transmissive film 110 and the light absorbing film 120. Therefore, the shower flare can be effectively suppressed. In addition, such a design is beneficial to make the reflectivity of the inner inclined surface 320 of the spacer 100 for light with a wavelength of 400 to 870 nm less than 0.600% to suppress various stray light and retain smooth surfaces of the object side surface 330 and the image side surface 340 to facilitate the assembly of the spacer 100 and the lens element L, thereby avoiding eccentricity or other assembly errors. In addition, the inner inclined surface 320 has a micro structure 326, which also makes the light transmissive film 110 and the light absorbing film 120 less likely to be peeled off due to the environment.

The manufacturing mode of the micro structure 326 may be: placing a surface where the light through hole O is located (for example, the object side surface 330 in the present embodiment) on a carrier, and placing a jig on the other surface of the spacer 100 (for example, the image side surface 340 in the present embodiment) to cover the object side surface 330 and the image side surface 340 to retain their smooth surfaces to facilitate the assembly of the spacer 100. In addition, the inner inclined surface 320 is subjected to sand blasting, electrical discharge, or laser processing to manufacture the micro structure. Then, the spacer 100 is washed and dried, and then the light absorbing film 120 and the light transmissive film 110 are plated.

Figure 6:
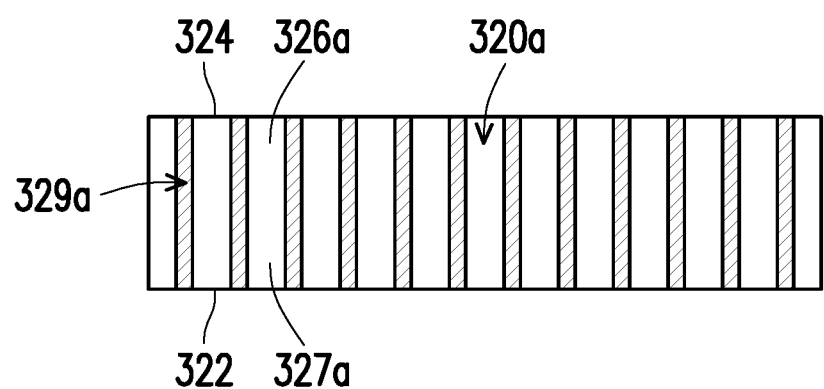
FIG. 6 is a schematic view of an inner inclined surface of a spacer according to another embodiment of the disclosure when the spacer is viewed outward from an optical axis in a radial direction.

FIG. 6 is a schematic view of an inner inclined surface of a spacer according to another embodiment of the disclosure when the spacer is viewed outward from an optical axis in a radial direction. Referring to FIG. 3 and FIG. 6, the spacer of the present embodiment and the spacer of FIG. 3 are similar but have different micro structures. In the present embodiment, a micro structure 326a of an inner inclined surface 320a includes a plurality of convex strips 327a extending from the inner edge 322 to the outer edge 324, and there is a groove 329a extending from the inner edge 322 to the outer edge 324 between two adjacent convex strips 327a. Light emitted to the inner inclined surface 320a will be continuously reflected by a sidewall of the convex strip 327a and absorbed by the light absorbing film 120 on the sidewall in the groove 329a between the two adjacent convex strips 327a, and is almost completely absorbed by the light absorbing film 120 after being reflected by the convex strip 327a repeatedly. In this way, shower flare can be effectively suppressed. In other words, the convex strip 327a and the groove 329a destroy a smooth reflection surface at the light through hole O, and destroy a reflection path of shower flare exiting in a specific direction, so the micro structure 326a may disperse and weaken the concentrated shower flare.

Figure 7:
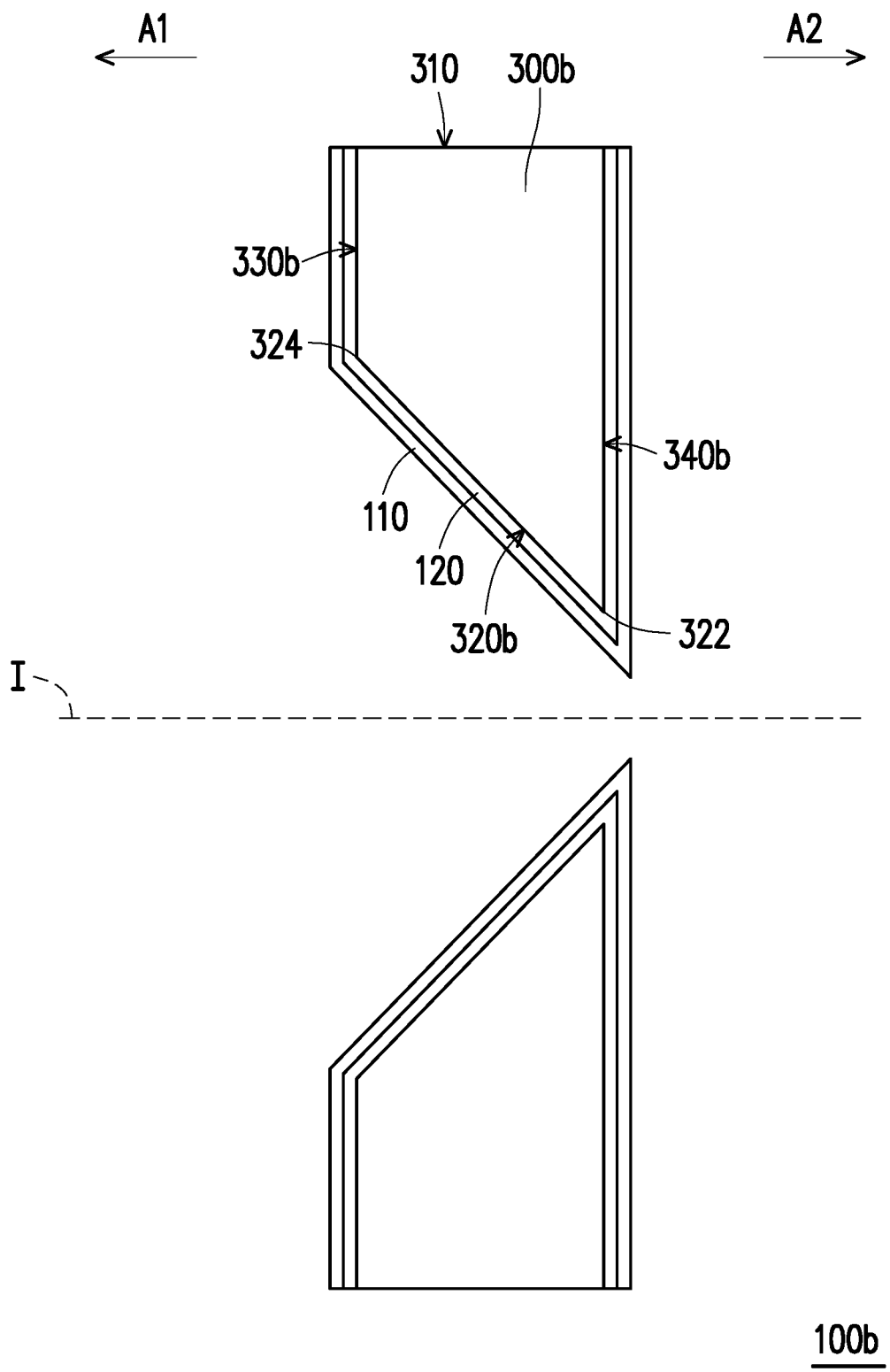
FIG. 7 is a schematic cross-sectional view of a spacer according to another embodiment of the disclosure.

FIG. 7 is a schematic cross-sectional view of a spacer according to another embodiment of the disclosure. Referring to FIG. 7, a spacer 100b of the present embodiment and the spacer 100 of FIG. 3 are similar but have the following main differences. In a spacer body 300b of the spacer 100b of the present embodiment, the inner edge 322 of an inner inclined surface 320b is located on an image side and connected to an image side surface 340b, and the outer edge 324 is located on an object side and connected to an object side surface 330b. That is to say, an inclination direction of the inner inclined surface 320b of FIG. 5 is different from an inclination direction of the inner inclined surface 320 of FIG. 3.

Figure 8:
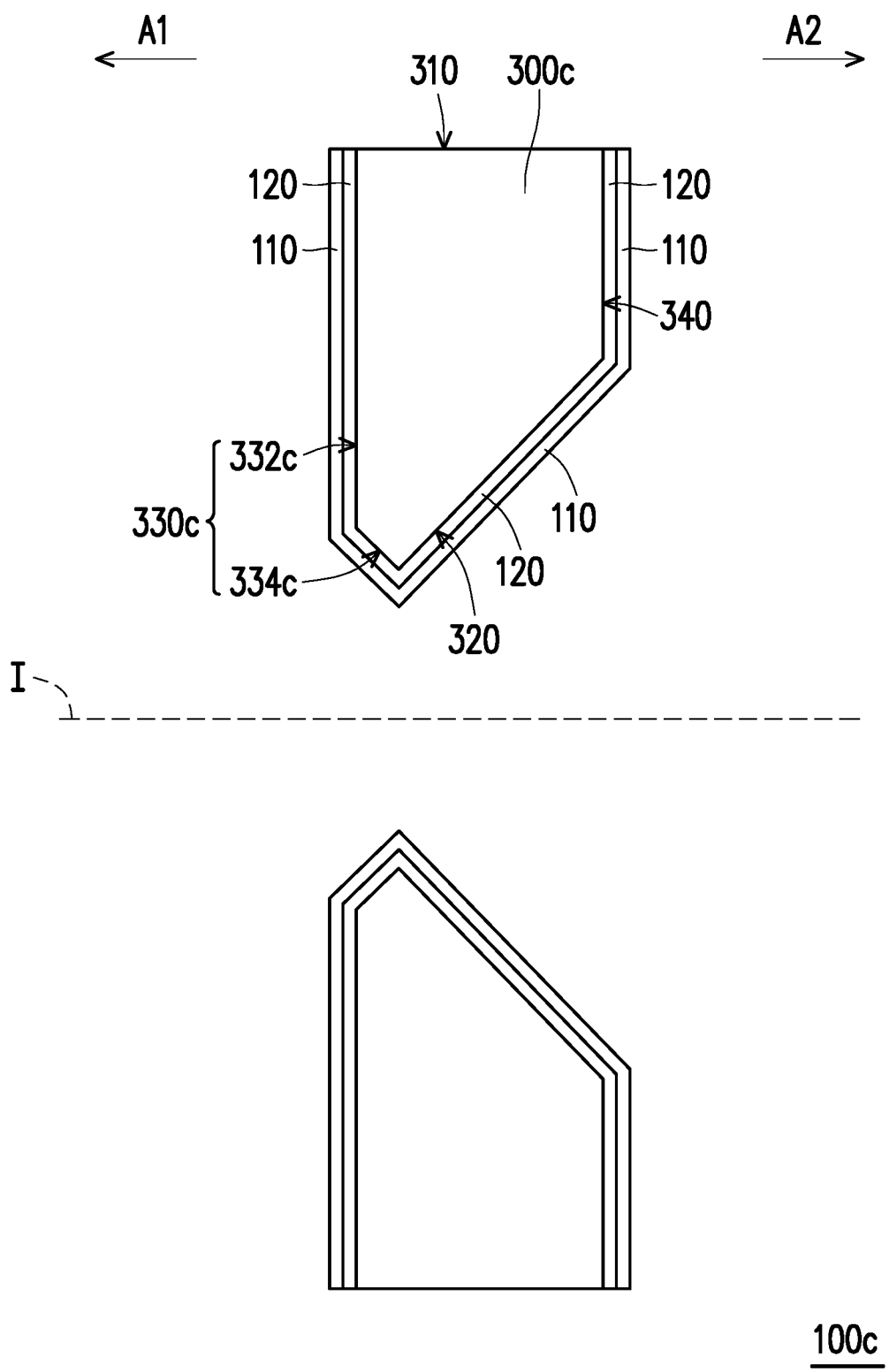
FIG. 8 is a schematic cross-sectional view of a spacer according to yet another embodiment of the disclosure.

FIG. 8 is a schematic cross-sectional view of a spacer according to yet another embodiment of the disclosure. Referring to FIG. 8, a spacer 100c of the present embodiment and the spacer 100 of FIG. 3 are similar but have the following main differences. In a spacer body 300c of the spacer 100c of the present embodiment, an object side surface 330c includes a radially extending surface 332c and an inclined surface 334c, and the radially extending surface 332c is perpendicular to the optical axis I. The inclined surface 334c is inclined relative to the optical axis I, and connects the inner inclined surface 320 with the radially extending surface 332c. In addition, in the present embodiment, all surfaces of the spacer body 300c facing the optical axis I are inclined relative to the optical axis I, and all the surfaces facing the optical axis I include the inner inclined surface 320 and the inclined surface 334c.

Figure 9:
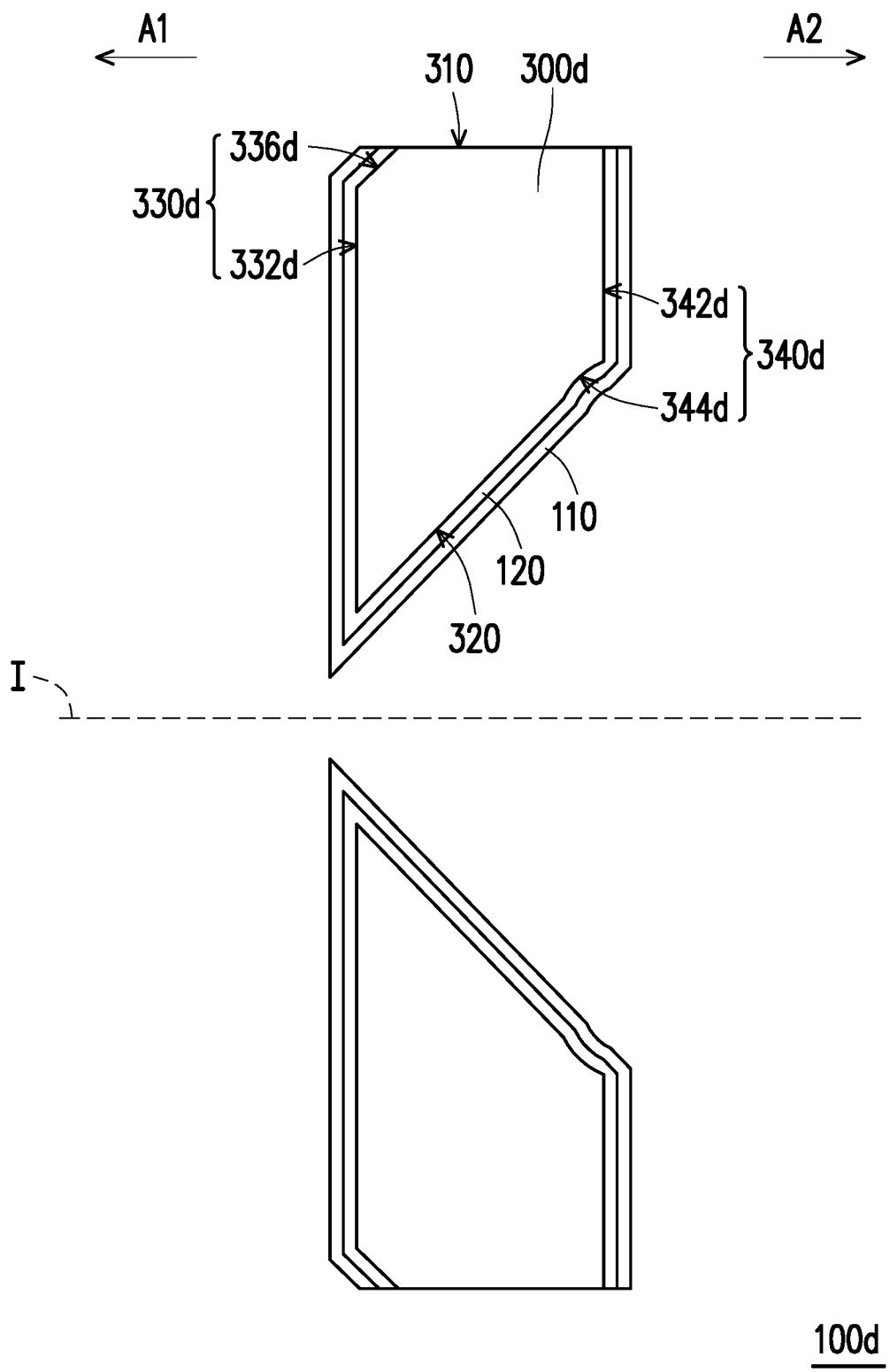
FIG. 9 is a schematic cross-sectional view of a spacer according to another embodiment of the disclosure.

FIG. 9 is a schematic cross-sectional view of a spacer according to another embodiment of the disclosure. Referring to FIG. 9, a spacer 100d of the present embodiment and the spacer 100 of FIG. 3 are similar but have the following main differences. In a spacer body 300d of the spacer 100d of the present embodiment, an image side surface 340d includes a radially extending surface 342d and a curved surface 344d, and the radially extending surface 342d is perpendicular to the optical axis I. The curved surface 344d connects the inner inclined surface 320 with the radially extending surface 342d. In FIG. 7, the curved surface 344d is a concave surface. However, in other embodiments, the curved surface 344d may also be a convex surface, or a concave-convex S-shaped surface or an undulating surface. The curved surface 344d is beneficial to increase the structural strength so that the lens barrel 210 is not easily deformed when the lens element L and the spacer 100 are installed.

In the present embodiment, an object side surface 330d includes a radially extending surface 332d and an inclined surface 336d, and the radially extending surface 332d is perpendicular to the optical axis I. The inclined surface 336d is inclined relative to the optical axis I, and connects the outer side surface 310 with the radially extending surface 332d.

In addition, in the present embodiment, all surfaces of the spacer body 300d facing the optical axis I are inclined relative to the optical axis I, and all the surfaces facing the optical axis I include the inner inclined surface 320 and the curved surface 344d.

Figure 10:
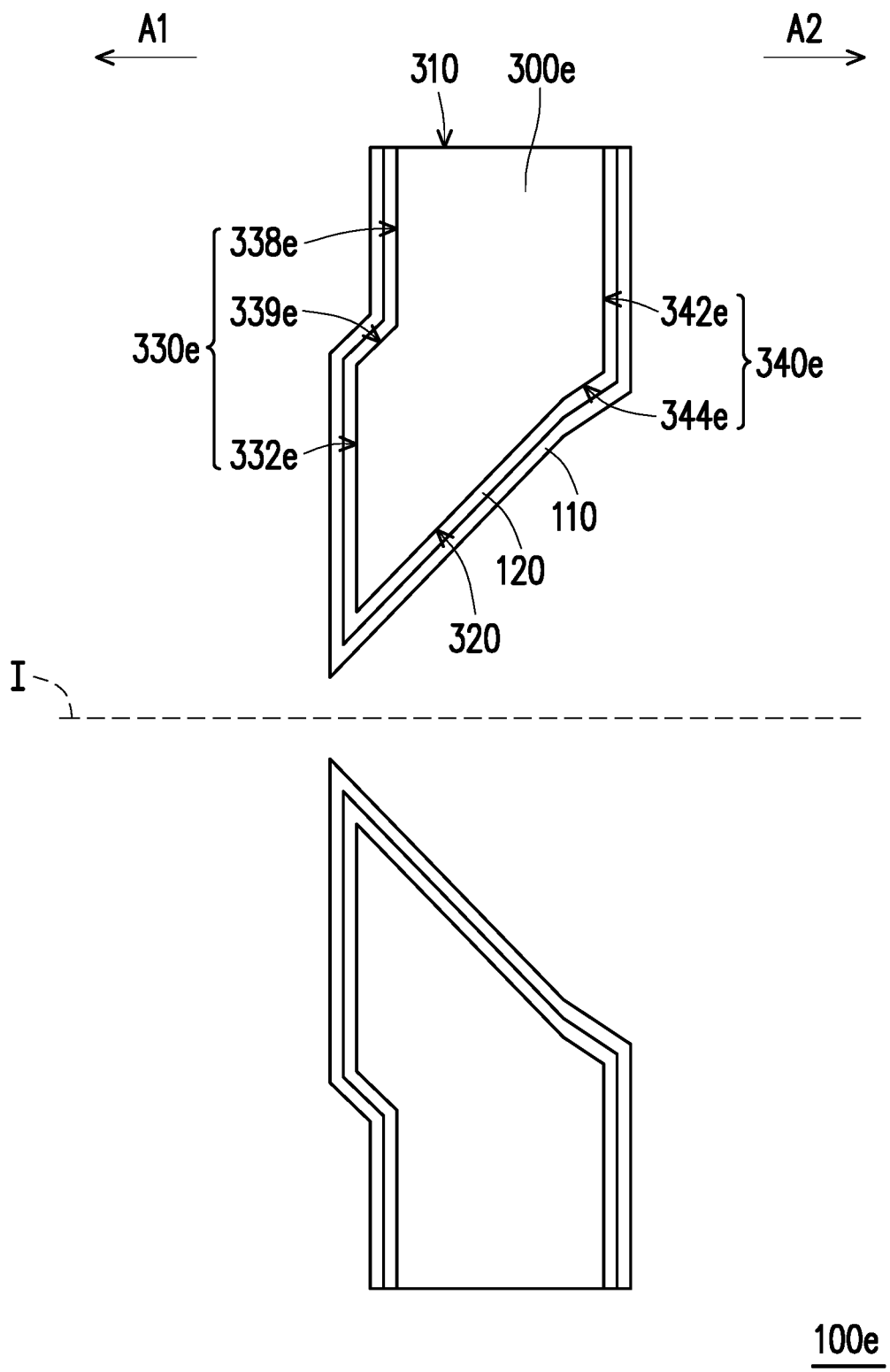
FIG. 10 is a schematic cross-sectional view of a spacer according to another embodiment of the disclosure.

FIG. 10 is a schematic cross-sectional view of a spacer according to another embodiment of the disclosure. Referring to FIG. 10, a spacer 100e of the present embodiment and the spacer 100 of FIG. 3 are similar but have the following main differences. In a spacer body 300e of the spacer 100e of the present embodiment, an image side surface 340e includes a radially extending surface 342e and an inclined surface 344e, and the radially extending surface 342e is perpendicular to the optical axis I. The inclined surface 344e connects the inner inclined surface 320 with the radially extending surface 342e. The inclined surface 344e is inclined relative to the optical axis I. In the present embodiment, a slope of the inclined surface 344e relative to the optical axis I is different from a slope of the inner inclined surface 320 relative to the optical axis I. In FIG. 10, for example, the slope of the inclined surface 344e relative to the optical axis I is less than the slope of the inner inclined surface 320 relative to the optical axis I. The inclined surface 344e is beneficial to increase the structural strength so that the lens barrel 210 is not easily deformed when the lens element L and the spacer 100 are installed.

In the present embodiment, an object side surface 330e includes a radially extending surface 338e, a radially extending surface 332e, and an inclined connecting surface 339e. The radially extending surface 338e is perpendicular to the optical axis I, and is connected to the outer side surface 310. The radially extending surface 332e is perpendicular to the optical axis I, and is connected to the inner inclined surface 320. The inclined connecting surface 339e is inclined relative to the optical axis I, and connects the radially extending surface 338e with the radially extending surface 332e. The inclined connecting surface 339e is beneficial to increase the structural strength so that the lens barrel 210 is not easily deformed when the lens element L and the spacer 100 are installed.

In addition, in the present embodiment, all surfaces of the spacer body 300e facing the optical axis I are inclined relative to the optical axis I, and all the surfaces facing the optical axis I include the inner inclined surface 320 and the inclined surface 344e.

Figure 11:
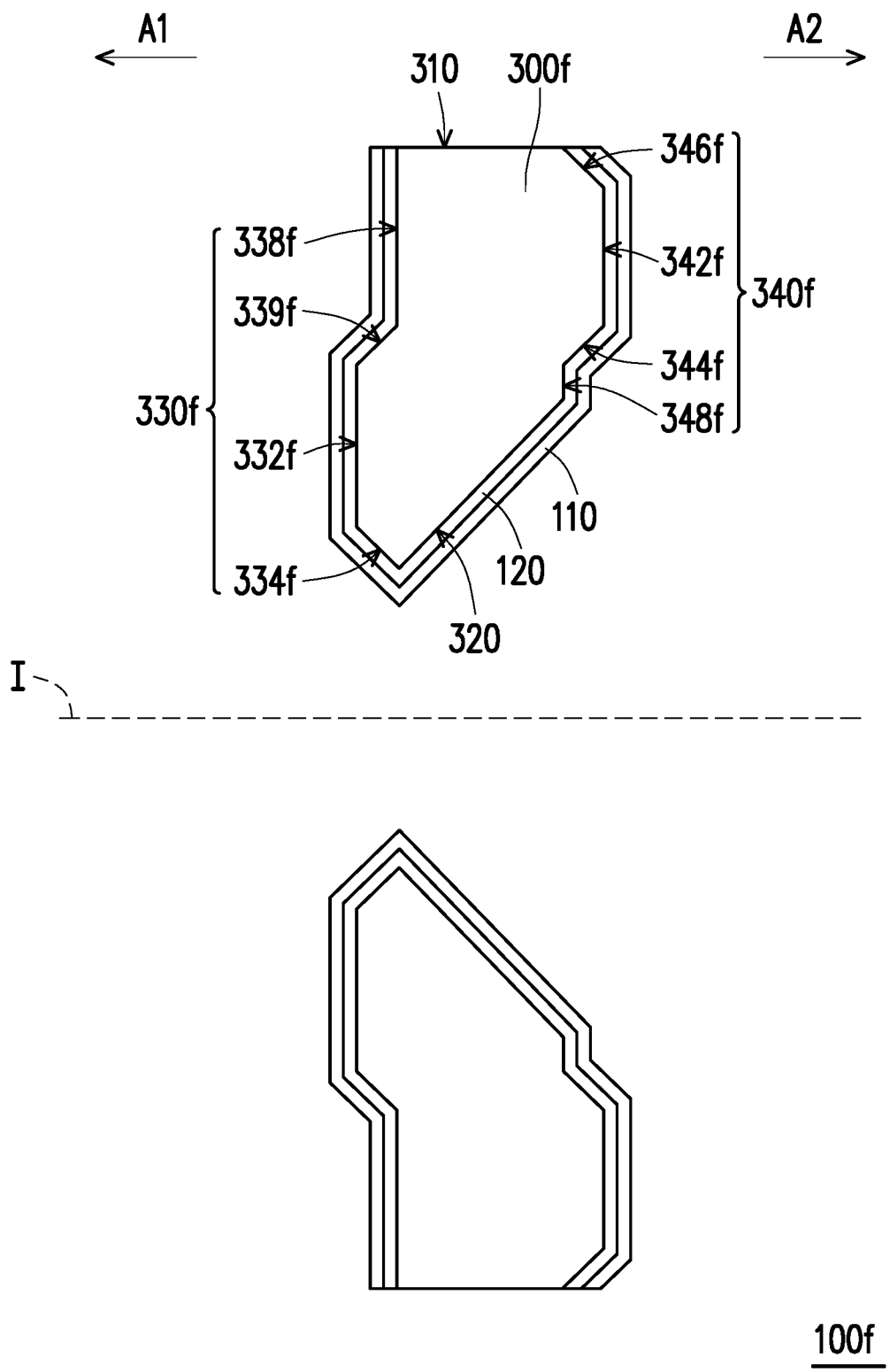
FIG. 11 is a schematic cross-sectional view of a spacer according to yet another embodiment of the disclosure.

FIG. 11 is a schematic cross-sectional view of a spacer according to yet another embodiment of the disclosure. Referring to FIG. 11, a spacer 100f of the present embodiment and the spacer 100 of FIG. 3 are similar but have the following main differences. In a spacer body 300f of the spacer 100f of the present embodiment, an image side surface 340f includes a radially extending surface 342f, an inclined surface 344f, an inclined surface 346f, and a radially connecting surface 348f. The radially extending surface 342f is perpendicular to the optical axis I. Both the inclined surface 344f and the inclined surface 346f are inclined relative to the optical axis I. The radially connecting surface 348f is perpendicular to the optical axis I, and connects the inclined surface 344f with the inner inclined surface 320. The inclined surface 346f connects the outer side surface 310 with the radially extending surface 342f, and the inclined surface 344f connects the radially extending surface 342f with the radially extending surface 348f. The inclined surface 346f and the inclined surface 344f are beneficial to increase the structural strength so that the lens barrel 210 is not easily deformed when the lens element L and the spacer 100 are installed.

In addition, in the present embodiment, an object side surface 330e includes a radially extending surface 338f, a radially extending surface 332f, an inclined connecting surface 339f, and an inclined surface 334f. The radially extending surface 338f is perpendicular to the optical axis I, and is connected to the outer side surface 310. The radially extending surface 332f is perpendicular to the optical axis I. The inclined connecting surface 339f is inclined relative to the optical axis I, and connects the radially extending surface 338f with the radially extending surface 332f. The inclined surface 334f is inclined relative to the optical axis I, and connects the radially extending surface 332f with the inner inclined surface 320. The inclined surface 334f and the inclined connecting surface 339f are beneficial to increase the structural strength so that the lens barrel 210 is not easily deformed when the lens element L and the spacer 100 are installed.

In addition, in the present embodiment, all surfaces of the spacer body 300f facing the optical axis I are inclined relative to the optical axis I, and all the surfaces facing the optical axis I include the inner inclined surface 320, the inclined surface 344f, and the inclined surface 334f.

Figure 12:
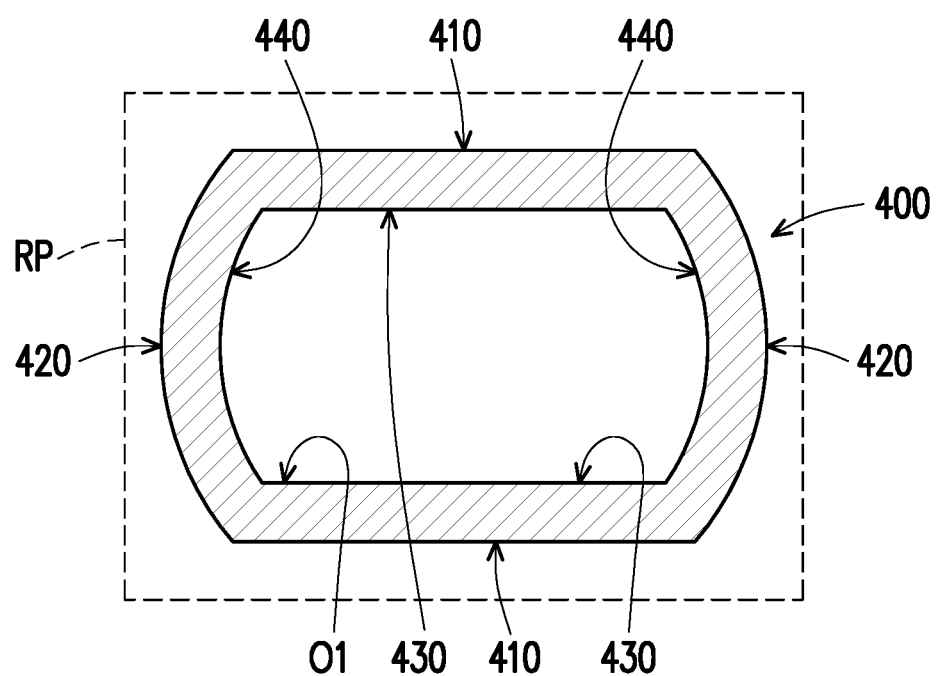
FIG. 12 is a schematic view of an orthographic projection of a spacer body of a spacer according to another embodiment of the disclosure on a reference plane perpendicular to an optical axis.

FIG. 12 is a schematic view of an orthographic projection of a spacer body of a spacer according to another embodiment of the disclosure on a reference plane perpendicular to an optical axis. Referring to FIG. 12, the spacer of the present embodiment and the spacer 100 of FIG. 2 and FIG. 3 are similar but have the following differences. When the spacer body 300 of FIG. 3 is orthographically projected to a reference plane RP perpendicular to the optical axis I, it may be of an annular shape (that is, donut shape) of FIG. 2, which is consistent with a front view of an object side of the spacer body 300. However, in the embodiment of FIG. 12, the front view of the object side of the spacer body may be runway-shaped, or an orthographic projection of the spacer body 300 on the reference plane RP perpendicular to the optical axis I may be runway-shaped. Specifically, an orthographic projection 400 of the spacer body 300 on the reference plane RP perpendicular to the optical axis I has two opposite outer straight edges 410, two opposite outer arc edges 420, two opposite inner straight edges 430, and two opposite inner arc edges 440. The two opposite outer straight edges 410 connect the two opposite outer arc edges 420, and the two opposite inner straight edges 430 connect the two opposite inner arc edges 440. The two opposite inner arc edges 440 are located between the two opposite outer arc edges 420, and the two opposite inner straight edges 430 are located between the two opposite outer straight edges 410. The two opposite outer straight edges 410 and the two opposite outer arc edges 420 are generated by an orthographic projection of the outer side surface 310 on the reference plane RP, while the two opposite inner straight edges 430 and the two opposite inner arc edges 440 are generated by an orthographic projection of the inner edge 322 on the reference plane RP. A central blank O1 of the orthographic projection 400 is generated by an orthographic projection of the light through hole O on the reference plane RP. The runway-shaped spacer is suitable for being applied to a periscope lens for lens installation, and the effects of stray light are reduced.

Figure 13:
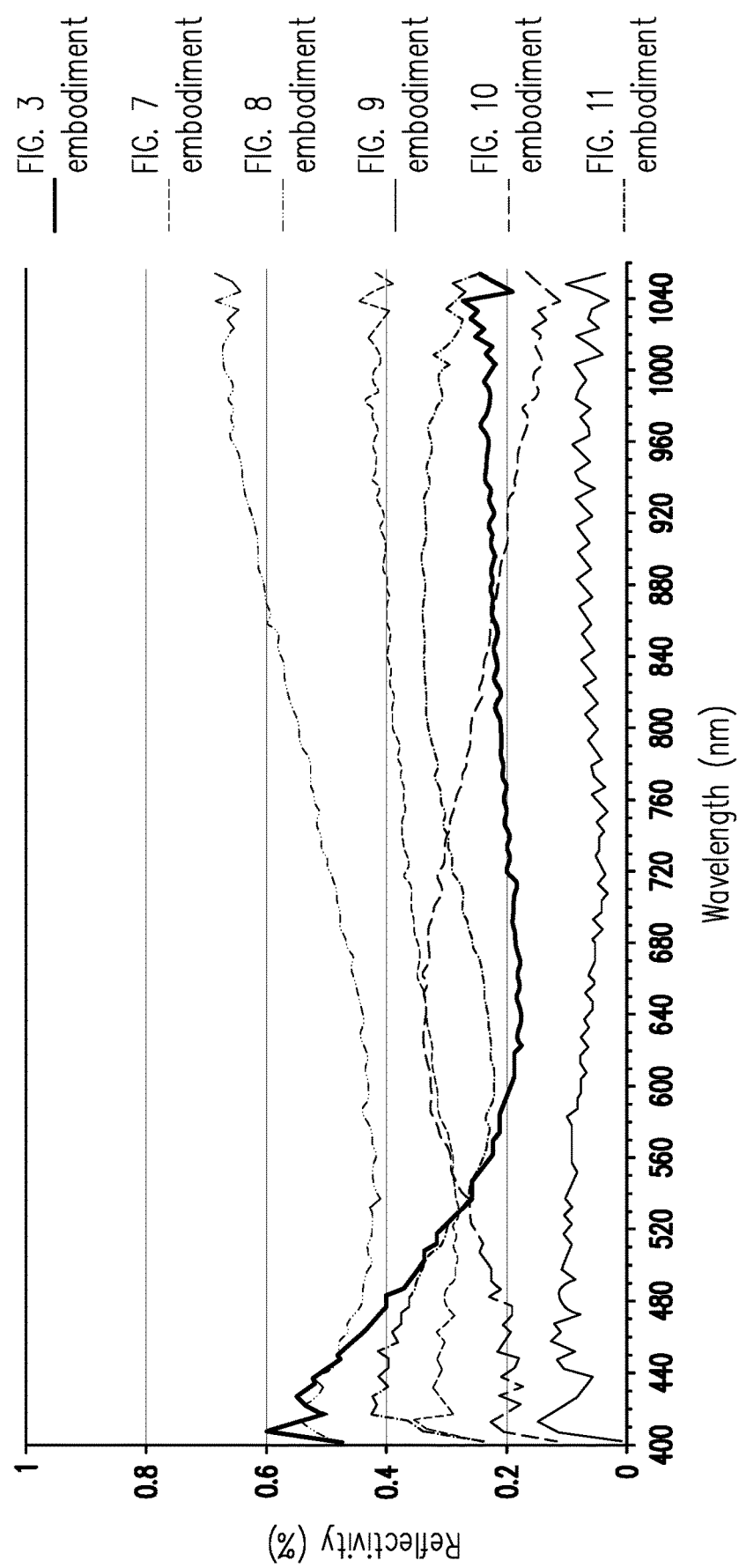
FIG. 13 is a reflection spectrum of inner inclined surfaces of the spacers of the various embodiments.

FIG. 13 is a reflection spectrum of inner inclined surfaces of the spacers of the various embodiments. Referring to FIG. 13, as can be seen from FIG. 13, in the various embodiments, the reflectivity of the inner inclined surface for light with a wavelength of 400 to 870 nm is less than 0.600%, which proves that the spacers of the various embodiments may effectively suppress stray light.

FIG. 14 is a table of various parameters of the spacer bodies of the various embodiments. Referring to FIG. 14, parameter values in the "FIG. 3 embodiment" column are parameter values of the spacer body 300, parameter values in the "FIG. 7 embodiment" column are parameter values of the spacer body 300b, parameter values in the "FIG. 8 embodiment" column are parameter values of the spacer body 300c, parameter values in the "FIG. 9 embodiment" column are parameter values of the spacer body 300d, parameter values in the "FIG. 10 embodiment" column are parameter values of the spacer body 300e, and parameter values in the "FIG. 11 embodiment" column are parameter values of the spacer body 300f. As can be seen from FIG. 14, a material of the spacer body 300d is plastic, and a material of the spacer bodies 300, 300b, 300c, 300e, and 300f is metal. The spacer 100d of the "FIG. 11 embodiment" matches the characteristics of the black appearance of the body. The reflectivity of the inner inclined surface 320 for light with a wavelength of 400 to 870 nm may be less than 0.200%, and the effect of suppressing stray light is better.

Based on the foregoing, in the spacer of the embodiment of the disclosure, since the inner inclined surface and the light transmissive film and the light absorbing film disposed thereon are used to effectively reduce the reflectivity of the inner inclined surface, the problem of stray light generated by the spacer can be effectively improved.

What is claimed is:

1. A spacer, comprising:
a spacer body, having:
an outer side surface;
an inner inclined surface;
an object side surface, facing an object side and connecting the outer side surface with the inner inclined surface; and
an image side surface, facing an image side and connecting the outer side surface with the inner inclined surface, wherein the inner inclined surface is located between an optical axis of the spacer and the outer side surface, the inner inclined surface comprises an inner edge adjacent to the optical axis and an outer edge far away from the optical axis, the inner edge forms a light through hole, and a material of the spacer body is metal; and
a light transmissive film and a light absorbing film, disposed on the inner inclined surface, wherein all surfaces of the spacer body facing the optical axis are inclined relative to the optical axis, and the spacer conforms to Do/Tmax≤55.000, where Do is a maximum outer diameter of the spacer in a direction perpendicular to the optical axis, and Tmax is a maximum thickness of the spacer in a direction of the optical axis.

2. The spacer of claim 1, wherein the light absorbing film is disposed between the light transmissive film and the spacer body.

3. The spacer of claim 1, wherein the light transmissive film is an anti-reflection multilayer film.

4. The spacer of claim 1, wherein the light transmissive film comprises at least one first layer and at least one second layer, a refractive index of the at least one second layer is lower than a refractive index of the at least one first layer, and the at least one first layer and the at least one second layer are alternately stacked.

5. The spacer of claim 1, wherein a reflectivity of the inner inclined surface within a wavelength light range of 400 to 870 nm is less than or equal to 0.600%.

6. The spacer of claim 1, wherein the spacer conforms to Do/Lbmax≤40.000, where Lbmax is a length of the inner inclined surface from the inner edge to the outer edge.

7. The spacer of claim 1, wherein the spacer conforms to Do/|Dio−Dii|≤33.000, where Dio is an inner diameter of the object side surface, and Dii is an inner diameter of the image side surface.

8. The spacer of claim 1, wherein an inclination angle of the inner inclined surface relative to the optical axis is greater than or equal to 5.000 degrees and is less than or equal to 70.000 degrees.

9. A spacer, comprising:
a spacer body, having:
an outer side surface;
an inner inclined surface;
an object side surface, facing an object side and connecting the outer side surface with the inner inclined surface; and
an image side surface, facing an image side and connecting the outer side surface with the inner inclined surface, wherein the inner inclined surface is located between an optical axis of the spacer and the outer side surface, the inner inclined surface comprises an inner edge adjacent to the optical axis and an outer edge far away from the optical axis, the inner edge forms a light through hole, the inner inclined surface has a micro structure, a surface roughness of the inner inclined surface is greater than a surface roughness of the object side surface and is greater than a surface roughness of the image side surface, and a material of the spacer body is metal; and
a light transmissive film and a light absorbing film, disposed on the inner inclined surface,
wherein the spacer conforms to Do/Tmax≤55.000, where Do is a maximum outer diameter of the spacer in a direction perpendicular to the optical axis, and Tmax is a maximum thickness of the spacer in a direction of the optical axis.

10. The spacer of claim 9, wherein the light absorbing film is disposed between the light transmissive film and the spacer body.

11. The spacer of claim 9, wherein the light transmissive film is an anti-reflection multilayer film.

12. The spacer of claim 9, wherein the light transmissive film comprises at least one first layer and at least one second layer, a refractive index of the at least one second layer is lower than a refractive index of the at least one first layer, and the at least one first layer and the at least one second layer are alternately stacked.

13. The spacer of claim 9, wherein a reflectivity of the inner inclined surface within a wavelength light range of 400 to 870 nm is less than or equal to 0.600%.

14. The spacer of claim 9, wherein the micro structure is irregularly distributed.

15. The spacer of claim 9, wherein the micro structure comprises a plurality of convex strips extending from the inner edge to the outer edge.

16. A spacer, comprising:
a spacer body, having:
an outer side surface;
an inner inclined surface;
an object side surface, facing an object side and connecting the outer side surface with the inner inclined surface; and
an image side surface, facing an image side and connecting the outer side surface with the inner inclined surface, wherein the inner inclined surface is located between an optical axis of the spacer and the outer side surface, the inner inclined surface comprises an inner edge adjacent to the optical axis and an outer edge far away from the optical axis, the inner edge forms a light through hole, the inner inclined surface has a micro structure, a surface roughness of the inner inclined surface is greater than a surface roughness of the object side surface and is greater than a surface roughness of the image side surface, and the surface roughness of the inner inclined surface is greater than or equal to 0.200 μm and is less than or equal to 7.000 μm; and
a light transmissive film and a light absorbing film, disposed on the inner inclined surface,
wherein the spacer conforms to Do/Tmax≤55.000, where Do is a maximum outer diameter of the spacer in a direction perpendicular to the optical axis, and Tmax is a maximum thickness of the spacer in a direction of the optical axis.

17. The spacer of claim 16, wherein the light absorbing film is disposed between the light transmissive film and the spacer body.

18. The spacer of claim 16, wherein the spacer conforms to Do/Lbmax≤40.000, where Lbmax is a length of the inner inclined surface from the inner edge to the outer edge.

19. The spacer of claim 16, wherein the spacer conforms to Do/|Dio−Dii|≤33.000, where Dio is an inner diameter of the object side surface, and Dii is an inner diameter of the image side surface.

20. The spacer of claim 16, wherein an inclination angle of the inner inclined surface relative to the optical axis is greater than or equal to 5.000 degrees and is less than or equal to 70.000 degrees.

* * * * *

UNITED STATES PATENT AND TRADEMARK OFFICE
CERTIFICATE OF CORRECTION

| | |
|---|---|
| PATENT NO. | : 11,460,612 B2 |
| APPLICATION NO. | : 16/944155 |
| DATED | : October 4, 2022 |
| INVENTOR(S) | : Ziwen Xu et al. |

It is certified that error appears in the above-identified patent and that said Letters Patent is hereby corrected as shown below:

On the Title Page

Item (73) Assignee should read: GENIUS ELECTRONIC OPTICAL (XIAMEN) CO., LTD., Fujian, (CN)

Signed and Sealed this
Nineteenth Day of September, 2023

Katherine Kelly Vidal
*Director of the United States Patent and Trademark Office*